United States Patent Office 3,476,801
Patented Nov. 4, 1969

3,476,801
PROCESS FOR THE PREPARATION OF
METHANYLIC ACID
Gianfranco Ferrari, Mantova, and Angelo Garberi, Pavia, Italy, assignors to Montecatini Edison S.p.A., a corporation of Italy
No Drawing. Filed June 24, 1968, Ser. No. 739,144
Claims priority, application Italy, June 28, 1967, 17,762/67
Int. Cl. C07c *143/58*
U.S. Cl. 260—508                   6 Claims

ABSTRACT OF THE DISCLOSURE

Methanylic acid (3-amino-benzenesulphonic acid) is prepared by hydrogenation of the corresponding nitro-acid, 3-nitro-benzenesulphonic acid. An aqueous solution of the sodium or calcium salt of m-nitrobenzenesulphonic acid, obtained by sulphonation of nitrobenzene with oleum and subsequent neutralization, may be used as starting material.

PRIOR ART

Until now, the production of methanylic acid on an industrial scale was based essentially on the chemical reduction with Fe and HCl (Bechamp process) of the aqueous solutions of the nitro-derivative coming from the sulphonation of the nitrobenzene and from the subsequent neutralization with $CaCO_3$ or $Na_2CO_3$.

Such solutions normally contain so many impurities as to render ineffective the common metal hydrogenation catalysts such as Ni, Pd, Pt, Rh, Ru.

The hydrogenation of the sodium m-nitrobenzenesulphonate in the said solutions is accomplished by catalysts which are resistant to sulphur, such as $MoS_2$ and $WS_2$ (French Patent No. 1,336,648 to BASF). However, high temperatures and high pressures are necessary for obtaining appreciable hydrogenation speeds. Thus, temperatures of from 100° C. to 200° C., and $H_2$ pressures of from 150 atm. to 200 atm. are necessary.

THE PRESENT INVENTION

It is found, in accordance with this invention, that the technical solutions of m-nitrobenzenesulphonate can be hydrogenated effectively by $H_2$ in the presence of catalysts based on metals of Group VIII of the Mendelejev Periodic Table, i.e., Pd, Pt. Rh, Ru, Ni, etc. and preferably Pd and Ni, provided the solutions are first purified by a special process as described in detail hereinbelow.

The impurities contained in the technical solutions of m-nitrobenzenesulphonate are eliminated, according to this invention, by a two-step process involving a first step of reduction and a second step of oxidation.

The heavy metal ions which are present in the solution may be precipitated by treatment with a dilute NaOH solution (bringing the technical solutions to a pH of 9-12) and then separated by filtering the hot solution, thereby increasing the life of the hydrogenation catalyst.

In carrying out the first step of the purifying process, i.e., the step of reduction, a reducing agent is added to the hot (80° C.–100° C.) technical solution in an amount not exceeding 2% by weight of the substratum, i.e., the nitrobenzene sulphonate. The solution is then stirred for a period of from 15 minutes to 2 hours, the solution is filtered, and the filtrate is left to cool.

As reducing agent there may be used both chemical reducers such as $SO_2$, sulphites, metals+acids, such as Fe+HCl, Mg+$H_2SO_4$, etc. and catalytic reducers such as Raney nickel, and exhausted catalysts of Ni, Pd, Pt, Rh, and Ru in the presence of $H_2$.

In the second (oxidation) step of the purifying process, there is used a chemical oxidant (oxidizer) such as $H_2O_2$, $O_2$, $HNO_3$, $Cl_2$, etc., in an amount not exceeding 3% by weight of the substratum. The oxidizer is added, preferably at room temperature, to the filtered solution of the reduction step, and the resulting mixture is stirred for 15–60 minutes.

The heavy metal ions are then precipitated and separated as described above.

The final purified technical solution of m-nitrobenzenesulphonate may then be hydrogenated by treatment with $H_2$ in contact with conventional hydrogenation catalysts based on the Group VIII metals, which remain active even after many recyclings.

The hydrogenation of the purified solutions with the catalysts based on the Group VIII metals may be carried out under widely varying conditions, for instance at temperatures from 20° C. to 200° C., pressures from sub-atmospheric to 200 atm., and concentrations of the catalyst (as metal) of from 0.01% to 10% by weight, on the substratum.

For each of the catalysts, the conditions of temperature, pressure and concentration determine the hydrogenation speed. Thus, when the catalyst is palladium supported on alumina (5% as Pd), for instance, good hydrogenation speeds are achieved at atmospheric pressure, room temperature and at catalyst concentrations of 0.05% to 0.1% as Pd on nitrobenzenesulphonate. However, in order to insure good thermal control of the reaction, the hydrogenation is preferably performed at a temperature of between 30° C. and 100° C. and a pressure between 1 atm. and 10 atms.

Various materials may be used as support for the palladium or other Group VIII metal, including carbon, $CaCO_3$, $Al_2O_3$, and $BaSO_4$. The nature of the support influences the activity of the catalyst. For supported palladium, the activity tends to decrease in the following order, using the supports mentioned:

$$\text{carbon} > CaCO_3 > Al_2O_3 > BaSO_4$$

Finely subdivided nickel, obtained by the decomposition of nickel formate in paraffin, exhibits good activity at a temperature of 30° C. to 100° C., a pressure of 1 atm. to 10 atms., and a concentration of metal nickel of 4% to 5% on the nitrobenzenesulphonate.

Using Raney nickel at a concentration of 4% to 5% on the nitrobenzenesulphonate, it is necessary to operate at a temperature of from 110° C. to 130° C. and a pressure of 30 to 50 atms.

The following examples are given to illustrate the invention and are not to be construed as limiting the scope thereof.

Example 1

20 liters of a technical aqueous solution of sodium m-nitrobenzenesulphonate in a concentration of 20% were purified by the method according to the present invention.

The solution was treated at incipient boiling in a nitrogen atmosphere with 70 g. of $Na_2SO_3$, under stirring for 30 minutes, filtered and left to cool to room temperature. It was then treated with 80 g. of $H_2O_2$ at 100 volumes. The resulting slightly discolored solution was alkalized by means of a 10% NaOH solution and the precipitated heavy metal hydroxides were separated by filtration.

The solution was hydrogenated in a horizontal 1-liter autoclave provided with a stirrer operating at 220 r.p.m., a sheathed thermometer and with a stainless steel filtering disc for removing the reacted solution while leaving the catalyst in the autoclave.

Into the autoclave described, there were charged 1.35 g. of Pd/$Al_2O_3$ (5% Pd) and 440 g. of the purified solution (the pH of which had been corrected to 6.5 by means of dilute $H_2SO_4$) with a titer corresponding to 3.99% of $NO_2$. The temperature was maintained at 80° C., while the pressure was kept constant at 10 kg./cm.², by continuous feeding of hydrogen.

The hydrogenation proceeded at a constant rate from start to finish and was complete after 50 minutes. At the completion of the reaction, the solution was discharged through the filter and acidified with 10% $H_2SO_4$ to precipitate the methanylic acid, which was filtered off.

The catalyst was used 36 consecutive times, in the hydrogenation of the same quantity of purified technical solution, without appreciable decrease in the activity of the catalyst. The average time for each recycling was 65 minutes; the yield of methanylic acid was always greater than 97%.

Determination of the methanylic acid in the reacted solution was effected by potentiometer titration with $HNO_2$. For all of the recyclings, the reaction resulted in a value of the order of zero with respect to the concentration of the nitro-derivative in the reaction solution and therefore the end of the reaction was easily checked.

In total, with 1.35 g. of the catalyst ($Pd/Al_2O_3$; 5% Pd, 15.8 g. of solution (corresponding to 3.1 kg. of sodium m-nitrobenzenesulphonate) were hydrogenated and the catalyst was still active.

Example 2

25 liters of a technical 20% aqueous solution of sodium m-nitrobenzenesulphonate were purified by the method of this invention.

The solution was treated at incipient boiling with 4.5 g. of Mg and 10 cc. of concentrated $H_2SO_4$. After about one hour the solution was filtered and 15 cc. of $H_2O_2$ at 100 volumes was added to the filtrate, with stirring which was continued for 15 minutes. The solution was then alkalized with a 10% aqueous solution of NaOH until the heavy metal ions were completely precipitated as hydroxides while bubbling an inert gas through the solution to completely eliminate oxygen. The final solution had a dark red color.

The hydrogenation was carried out in an autoclave as described in Example 1 at 120° C. and under a pressure of 40 kg./cm.² using Raney nickel as the catalyst, the autoclave being charged with 4.0 g. of Raney Ni and 545 g. of the purified solution (pH corrected to 3.5 by dilute $H_2SO_4$) with a titer corresponding to 3.95% in $NO_2$.

The hydrogenation proceeded at constant speed and was complete in 25 minutes. At the end of the reaction, 326 g. of solution were withdrawn from the autoclave and an equal amount of purified solution was charged.

Also, in this instance, the hydrogenation was complete in 25 minutes.

The same catalyst was reused in 33 successive hydrogenation cycles conducted for times comprised between 25 minutes and 75 minutes.

In total, using 4.9 g. of the catalyst, there were hydrogenated, with yields of methanylic acid greater than 97%, 11.4 kg. of solution corresponding to 2.2 kg. of sodium m-nitrobenezenesulphonate.

Example 3

A technical solution purified as described in Example 1 (and at 3.29% of $NO_2$) was fed continuously for ten hours at a rate of 0.3 l./hr. into a small reactor of 250 cc. capacity, containing 160 g. of a catalyst $Pd/Al_2O_3$ (0.5% Pd) in pellets, concurrently with 70 Nl./hr. of $H_2$, the excess $H_2$ being continuously recycled. The temperature was maintained at 80° C. and the pressure was maintained at 10kg./cm.².

The conversion of the nitrobenzenesulphonate in the purified solution was total after only one passage of the solution. The yield of sodium methanylate remained constant at 98%.

Comparative Example A.—550 g. of a non-purified technical solution of m-nitrobenzenesulphonate were hydrogenated as described in Example 1, using 2.75 g. of $Pd/Al_2O_3$ (5% Pd) at 80° C. and under a $H_2$ pressure of 10 kg./cm.².

The reaction speed decreased slowly from the beginning to the end of the hydrogenation with a yield of 96%, which required 100 minutes. When the same catalyst was reused in the hydrogenation of a second quantity of the non-purified technical solution, only 85% of the m-nitrobenzenesulphonate was hydrogenated in 250 minutes and the catalyst was thereafter incapable of completing the hydrogenation.

Comparative Example B.—440 g. of a technical of sodium m-nitrobenzenesulphonate which had not been purified were hydrogenated in an autoclave as described in Example 1, at 80° C. and under a pressure of 10 kg./cm.² of hydrogen, in the presence of 3.5 g. of finely subdivided nickel obtained by the decomposition of nickel formate in paraffin (Allison et al., Helvetica Chim. Acta, 34 (1951) 818). The reaction speed decreased slowly from the beginning to the end of the test which was completed in 310 minutes, with a yield of 95.6%.

Example 4

440 g. of a technical solution of sodium m-nitrobenzenesulphonate, purified according to the present invention and as described in Example 1, were hydrogenated as described in Comparative Example B, using 3.5 g. of finely subdivided nickel, a temperature of 80° C. and a $H_2$ pressure of 10 kg./cm.². The reaction speed was constant and the hydrogenation was complete within 115 minutes. The yield of sodium methanylate was 98%.

Example 5

10 liters of a technical aqueous solution of sodium m-nitrobenzenesulphonate at 2% were purified by the method according to the present invention.

The solution was treated at 50–60° C. by bubbling 78 g. of chlorine for 2 hours. Then 2 ml. of Raney-Ni paste were added and the suspension was stirred at 70–80° C. for 1 hour. After filtration, the resulting solution was alkalized by means of a 10% NaOH solution and the precipitated heavy metal hydroxides were separated by filtration. The pH of the solution was then brought to 3.5 by dilute $H_2SO_4$.

The hydrogenation was carried out as in Example 2, using Raney-Ni and 40 kg/cm.² of $H_2$. The autoclave, described in Example 1, was charged with 4.0 g. of Raney Ni and 545 g. of the purified solution with a titer of 3.95% in $NO_2$.

The hydrogenation was complete in 28 minutes. At the end of the reaction, 326 g. of solution were withdrawn from the autovalve and an equal amount of purified solution was charged. In this instance the hydrogenation was complete in 25 minutes.

The same catalyst was reused in 22 successive hydrogenation cycles conducted for times comprised between 25 and 80 minutes.

As will be apparent, variations in details may be made in practicing the invention without departing from the spirit thereof. It is intended, therefore, to include in the scope of the appended claims, all such changes and modifications as will be obvious to those skilled in the art from the description and working examples given herein.

What is claimed is:

1. A process for producing methanylic acid by hydrogenating, with hydrogen and in the presence of a Group VIII metal as catalyst, an aqueous technical solution of sodium or calcium m-nitrobenzenesulphonate, characterized in that, before the hydrogenation, said solution is treated with a reducing agent selected from the group consisting of $SO_2$, sulphites, Fe+HCl, Mg+$H_2SO_4$, Raney nickel and exhausted catalysts of Ni, Pd, Pt, Rh, and Ru in the presence of $H_2$, in an amount not exceeding 2% by weight, based on the nitrobenzene sulphonate, thereafter filtered and then oxidized by treatment with an oxidizing agent selected from the group consisting of $H_2O_2, O_2HNO_3$ and $Cl_2$, in an amount not exceeding 3% by weight, based on the nitrobenzene sulphonate.

2. The process according to claim 1, further characterized in that the treatment with the reducing agent is carried out at a temperature of 80° C. to 100° C., and the treatment with the oxidizing agent is performed at room temperature.

3. The process according to claim 1, further characterized in that the reducing agent is selected from the group consisting of $SO_2$, sulphites, and metals+acids.

4. The process according to claim 1, characterized in that after the reduction and oxidation, the technical solution is treated with aqueous sodium hydroxide and the heavy metals which are thus precipitated as hydroxides, are separated from the solution.

5. The process according to claim 1, characterized in that the hydrogenation is carried out at a temperature of from 20° C. to 200° C., at $H_2$ pressure of from subatmospheric to 200 atm., and with a catalyst concentration (as metal) of from 0.01 to 10% by weight, based on the weight of the nitrobenzene sulphonate.

6. The process according to claim 1, further characterized in that the Group VIII metal is supported.

References Cited

UNITED STATES PATENTS

| | | | |
|---|---|---|---|
| 3,073,865 | 1/1963 | Spiegler | 260—508 |
| 3,328,465 | 6/1967 | Spiegler | 260—508 |

DANIEL D. HORWITZ, Primary Examiner

UNITED STATES PATENT OFFICE
CERTIFICATE OF CORRECTION

Patent No. 3,476,801            Dated November 4, 1969

Inventor(s) Gianfranco Ferrari et al

It is certified that error appears in the above-identified patent and that said Letters Patent are hereby corrected as shown below:

Col. 1, line 30, "[FIAT Final Report No. 1313, vol. 1, page 187-191; PB 85.172 (1/2/48) ]" omitted.

Col. 3, lines 23 and 24, "closed parenthesis" after - - -(Pd/Al O ; 5% Pd - - -;

line 60, "m-nitrobenezenesulphonate" should be
               - - -m-nitrobenzenesulphonate- - -;

line 71, "10kg./$cm^2$" should be - - -10 kg./$cm^2$- - -.

Col. 4, line 14, "solution" should be inserted after - - -technical- - -.

End of printed patent insert " I and II " after - - -Spiegler- - - cited as references.

Signed and sealed this 25th day of June 1974.

(SEAL)
Attest:

EDWARD M. FLETCHER, JR.            C. MARSHALL DANN
Attesting Officer                   Commissioner of Patents